United States Patent [19]

Kishida et al.

[11] Patent Number: 5,539,549
[45] Date of Patent: Jul. 23, 1996

[54] ACTIVE MATRIX SUBSTRATE HAVING ISLAND ELECTRODES FOR MAKING OHMIC CONTACTS WITH MIM ELECTRODES AND PIXEL ELECTRODES

[75] Inventors: Masahiro Kishida, Nabari; Toshiyuki Yoshimizu, Nara-ken; Toshiaki Fukuyama, Nara; Yoshihisa Ishimoto, Sakai, all of Japan

[73] Assignee: Sharp Kabushiki Kaisha, Osaka, Japan

[21] Appl. No.: 189,748

[22] Filed: Feb. 1, 1994

[30] Foreign Application Priority Data

Feb. 1, 1993  [JP]  Japan ..................... 5-015013

[51] Int. Cl.⁶ ............... G02F 1/136; G02F 1/1343
[52] U.S. Cl. ................... 359/58; 359/60; 359/87
[58] Field of Search ................. 359/57, 58, 60, 359/87, 59

[56] References Cited

U.S. PATENT DOCUMENTS

| | | | |
|---|---|---|---|
| 4,804,953 | 2/1989 | Castleberry | 359/59 |
| 4,930,874 | 6/1990 | Mitsumune | 359/59 |
| 4,991,939 | 2/1991 | Momose | 359/59 |
| 5,274,482 | 12/1993 | Morita | 359/58 |
| 5,299,040 | 3/1994 | Mizobata | 359/60 |

FOREIGN PATENT DOCUMENTS

| | | | |
|---|---|---|---|
| 0173027 | 7/1988 | Japan | 359/58 |
| 1270027 | 10/1989 | Japan | 359/57 |
| 1283524 | 11/1989 | Japan | 359/57 |
| 281031 | 3/1990 | Japan . | |

OTHER PUBLICATIONS

Device Electronics for Integrated Circuits, 2nd. Ed. R. S. Muller, T. R. Kamins 1977 (pages 147–148).

Primary Examiner—Anita Pellman Gross
Assistant Examiner—Trep H. Nguyen

[57] ABSTRACT

An active matrix substrate according to the present invention comprises an insulating substrate; a pixel electrode formed on the insulating substrate; a signal line for supplying a signal charge to the pixel electrode; a two-terminal nonlinear device including a lower electrode formed on the insulating substrate, an insulator covering the lower electrode, and an upper electrode formed on the insulator, the device changing a current which flows through the insulator in accordance with a voltage applied to the lower electrode and the upper electrode; and an island portion for connecting the upper electrode to the pixel electrode, the island portion making ohmic contact with each of the upper electrode and the pixel electrode.

14 Claims, 7 Drawing Sheets

ACTIVE MATRIX SUBSTRATE HAVING ISLAND ELECTRODES FOR MAKING OHMIC CONTACTS WITH MIM ELECTRODES AND PIXEL ELECTRODES

BACKGROUND OF THE INVENTION

1. Field of the Invention

The present invention relates to an active matrix substrate used in, for example, a liquid crystal display apparatus. In particular, the present invention relates to an active matrix substrate using two-terminal nonlinear devices as switching elements.

2. Description of the Related Art

A liquid crystal display apparatus which is one kind of display for a user interface has widely been used in recent years, because it is superior to a CRT (Cathode Ray Tube) in display quality. Further, the liquid crystal display apparatus has advantages of saving space, light weight, low power, long life, and the like. Such apparatus have various applications, for instance in the field of office automation, and in an audio visual field. In particular, in order to realize a larger-size display with a high resolution, more improvement of the display quality is required. Therefore, the demand for a liquid crystal display apparatus of an active matrix driving type (hereinafter, referred to as "an active matrix display apparatus") has greatly been increased.

Active matrix display apparatus are roughly classified in two types according to their types of switching element. One uses three-terminal nonlinear devices such as TFTs (Thin Film Transistors) and the other uses two-terminal nonlinear devices. In the fabrication of the liquid crystal display apparatus using three-terminal nonlinear devices, a process for depositing a thin film and a photolithographic process for patterning the thin film require 6 to 8 or more times. This makes the fabrication of the liquid crystal display complicated, which raises the cost therefor. Thus, decreasing the cost is the most important problem. On the other hand, a liquid crystal display apparatus using two-terminal nonlinear devices as switching elements is superior to the liquid crystal display device using the three-terminal nonlinear devices for its lower cost. Accordingly, the liquid crystal display apparatus using the two-terminal nonlinear devices has rapidly been developed.

As a representative example of the two-terminal nonlinear device, a Metal-Insulator-Metal device (hereinafter, referred to as "an MIM device") is known. A liquid crystal display apparatus using the MIM devices as switching elements comprises an active matrix substrate on which pixel electrodes and MIM devices are formed, a counter substrate on which counter electrodes are formed, and a liquid crystal layer interposed therebetween. Steepness in the difference of the transmittance of the liquid crystal layer with respect to the change of the voltage applied to the liquid crystal layer is improved, so that a display with a high contrast can be obtained even in high duty driving in accordance with the larger-size display screen with a high resolution of the liquid crystal display apparatus.

A structure of the conventional active matrix substrate on which the MIM devices are formed as switching elements of a liquid crystal display apparatus will be described with reference to FIGS. 8 and 9. These figures show the active matrix substrate for a single pixel.

Figure 8:
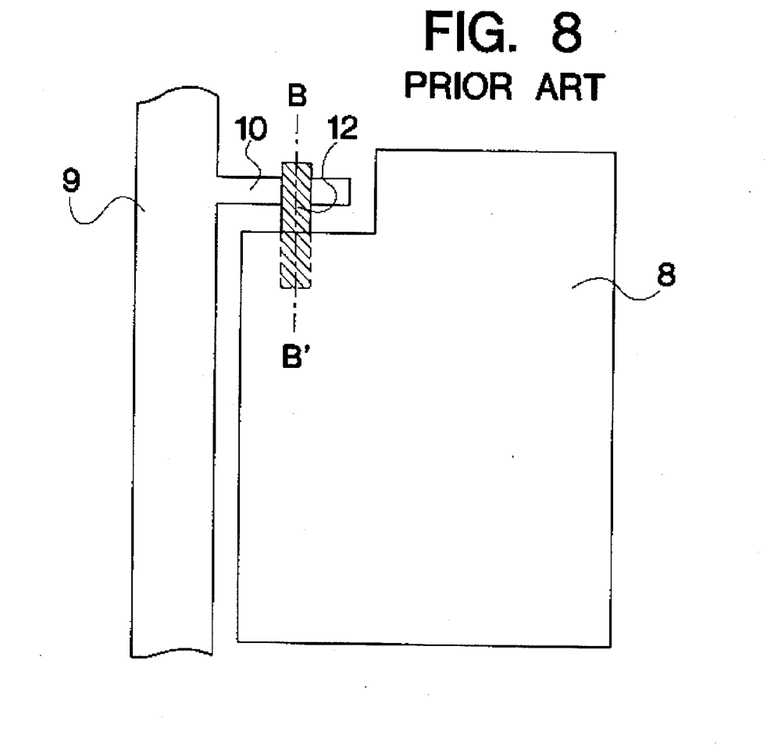
FIG. 8 is a plan view of a conventional active matrix substrate in the case where upper electrodes are formed of Ti.

The active matrix substrate of FIG. 8 comprises a glass substrate 13. Signal lines 9 of Ta and lower electrodes 10 each branched from the signal lines 9 are formed on the glass substrate 13. An insulator 11 of $Ta_2O_5$ is formed over each lower electrode 10. On each insulator 11, an upper electrode 12 of Ti is formed. An MIM device 7 comprises one lower electrode 10, one upper electrode 12, and one insulator 11 interposed therebetween. The upper electrode 12 is electrically connected to a corresponding one of pixel electrodes 8. The current flows through the signal line 9, the lower electrode 10, the insulator 11, the upper electrode 12, and the pixel electrode 8 in this order. Alternatively, the current can flow in the reverse order. Wiring formed of ITO or the like are formed on the counter substrate so as to cross the signal lines 9 to each other at a right angle. The active matrix substrate and the counter substrate are attached to each other so that surfaces thereof with the wirings face each other, constituting a liquid crystal cell.

Figure 9:
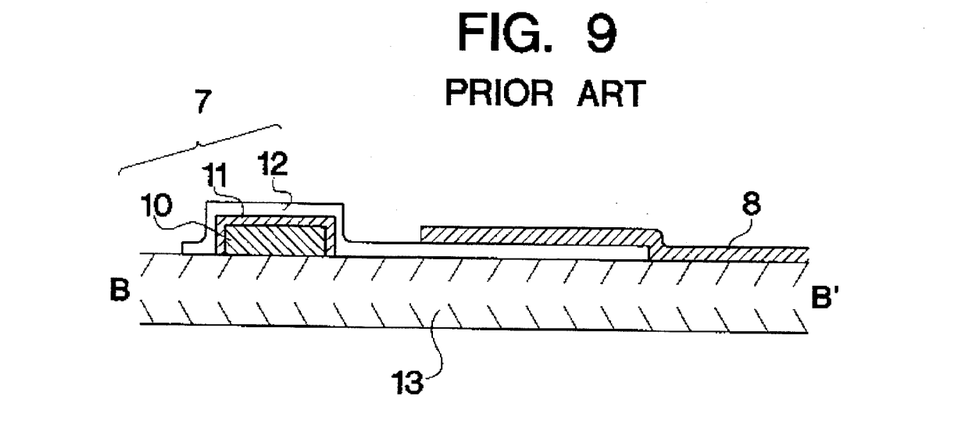
FIG. 9 is a cross-sectional view of FIG. 8 taken along a line B–B'.

The active matrix substrate of FIGS. 8 and 9 is fabricated as follows:

First, a thin Ta film is deposited on the glass substrate 13 so as to have a thickness of 3000 angstroms and then patterned into a desired shape by photolithography to form the signal lines 9 and the lower electrodes 10. Successively, an exposed portion of each lower electrodes 10 is anodized to form a $Ta_2O_5$ film with a thickness of 600 angstroms thereon. The $Ta_2O_5$ films work as the insulators 11. After that, a Ti film is deposited over the glass substrate 13 by sputtering or the like so as to have a thickness of 4000 angstroms and then patterned into a desired shape by photolithography to form the upper electrodes 12. Moreover, a transparent conductive film of ITO is deposited on the resulting glass substrate 13 so as to have a thickness of 1000 angstroms and then patterned to form the pixel electrodes 8.

It is preferred that the MIM device may have a symmetrical curve of a current-voltage characteristic between a state where the current flows from the lower electrode to the upper electrode and a state where the current flows from the upper electrode to the lower electrode. In order to realize such a symmetrical current-voltage characteristic, the lower electrode and the upper electrode may be formed of the same material. However, when the upper electrode is formed of the same material as that of the lower electrode, the lower electrode and the insulator obtained by anodization of the exposed portion of the lower electrode may probably be etched while the Ti film is patterned by photolithography to form the upper electrode. Due to this, in the case where the lower electrode and the upper electrode are formed of the same material, the patterning for forming the upper electrode cannot be conducted by photolithography. In view of such facts, material for the upper electrode is selected so that an anodized oxide film and the lower electrode are not etched.

Further, the material for the upper electrode thus selected should be selected so as not to damage the above-mentioned symmetrical current-voltage characteristic of the MIM device. For example, in the case where a Ta film is used for the lower electrode, a Ti, Al film, or the like can be used for the upper electrode.

Figure 10:
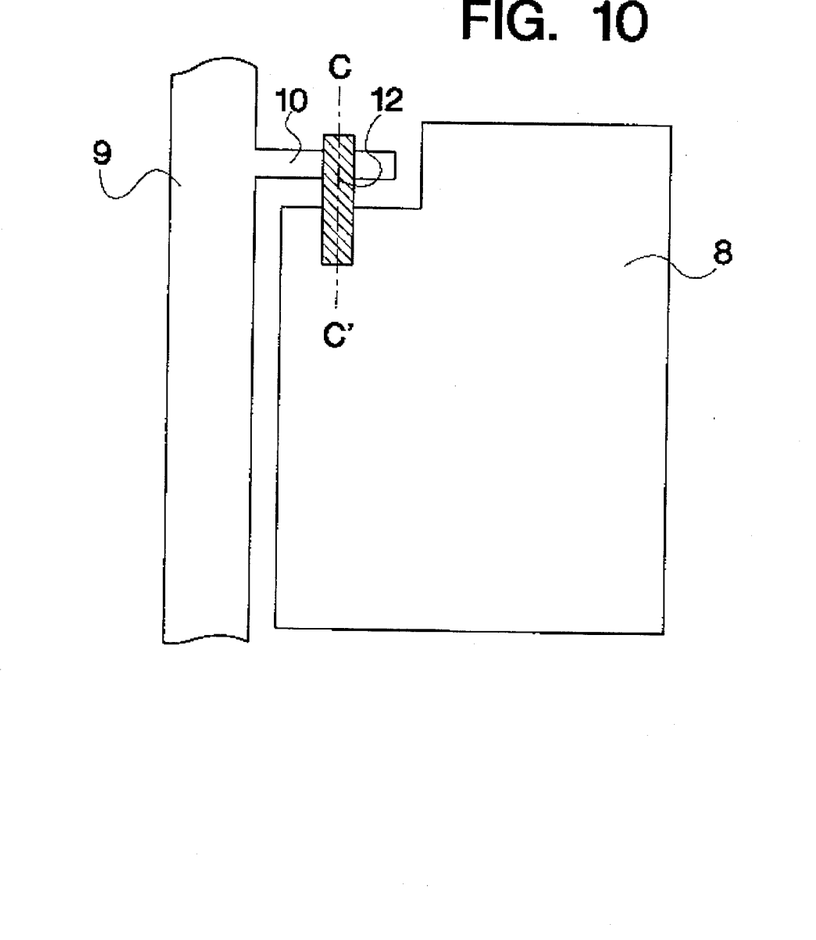
FIG. 10 is a plan view of a conventional active matrix substrate in the case where upper electrodes are formed of Al.
Figure 11:
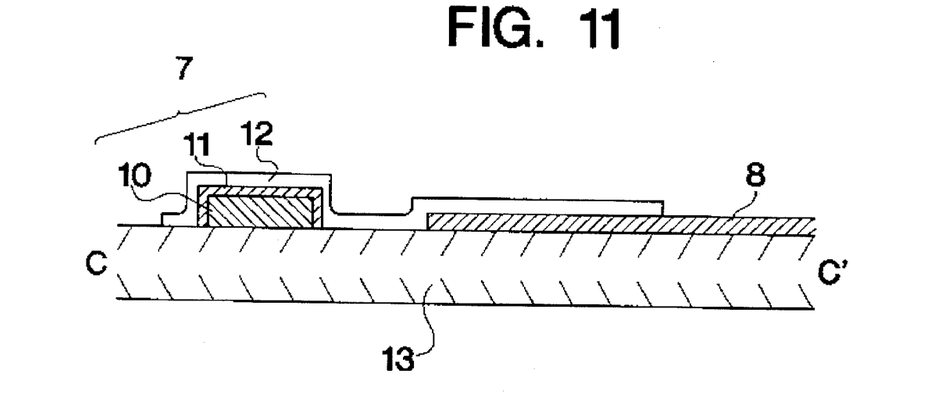
FIG. 11 is a cross-sectional view of FIG. 10 taken along a line C–C'.

In general, as shown in FIGS. 8 and 9, the upper electrode is formed before the formation of the pixel electrode. However, in the case of using an Al film for the upper electrode, the Al film is etched by an etchant for ITO while patterning of the ITO film. Therefore, the pixel electrode should be first formed as shown in FIGS. 10 and 11, and then the upper electrode should be formed so as to finally cover part of the pixel electrode.

In the liquid crystal display apparatus, a voltage applied to the MIM device as the switching element is divided to a capacity of the MIM device and a capacity of a liquid crystal layer interposed between the active matrix substrate and the counter substrate. In order to obtain a display with a high resolution by driving the liquid crystal layer, the capacity of the MIM device will be set so that the capacity of the MIM device is one-tenth or less of the capacity of the liquid crystal layer. For example, in the case where pixels of the liquid crystal display apparatus are formed at 300 μm pitch, the MIM device has a size of approximately 5 μm×6 μm.

In the active matrix substrate shown in FIGS. 8 and 9, the current flows thought the signal line 9, the lower electrode 10, the insulator 11, the upper electrode 12, and the pixel electrode 8 in this order, or in the reverse order as mentioned above. However, in a case where the upper electrode is formed of Ti, an electrical barrier occurs in the vicinity of an interface between the pixel electrode 8 of an oxide (ITO or the like) and the upper electrode 12 of Ti, so that the pixel electrode 8 and the upper electrode 12 are not electrically well connected to each other. That is, the pixel electrode 8 and the upper electrode 12 are in non-ohmic contact with each other. Further, in the case of using a metal easily oxidizable such as Al as a material for the upper electrode 12, since the upper electrode 12 and the pixel electrode 8 of an oxide film such as an ITO film are directly in contact with each other, the Al or the like is oxidized on an interface between the upper electrode 12 and the pixel electrode 8 to form an oxide. As a result, the upper electrode 12 and the pixel electrode 8 are not electrically well connected to each other. Moreover, a voltage drop occurs in the vicinity of the interface between the pixel electrode 8 and the upper electrode 12, so that the symmetrical curve of the current-voltage characteristic of the MIM device is damaged. These cause undesirable phenomena such as the occurrence of a residual image and a flicker on the display of the liquid crystal display apparatus.

SUMMARY OF THE INVENTION

An active matrix substrate according to the present invention comprises an insulating substrate; a pixel electrode formed on the insulating substrate; a signal line for supplying a signal charge to the pixel electrode; a two-terminal nonlinear device including a lower electrode formed on the insulating substrate, an insulator covering the lower electrode, and an upper electrode formed on the insulator, the device changing a current which flows through the insulator in accordance with a voltage applied to the lower electrode and the upper electrode; and an island portion for connecting the upper electrode to the pixel electrode, the island portion making ohmic contact with each of the upper electrode and the pixel electrode.

In one embodiment of the invention, the island portion is formed of the same material as that of the lower electrode.

In another embodiment of the invention, the lower electrode and the island portion are formed of the same layer.

In still another embodiment of the invention, the lower electrode is formed of a first material; the upper electrode is formed of a second material; and the pixel electrode is formed of a third transparent material.

In still another embodiment of the invention, the upper electrode makes non-ohmic contact with the pixel electrode.

In still another embodiment of the invention, the insulator is an oxide film obtained by anodization of an exposed portion of the lower electrode.

In still another embodiment of the invention, the lower electrode is formed of Ta.

In still another embodiment of the invention, the upper electrode and the pixel electrode are directly in contact with parts of the island portion, respectively.

In still another embodiment of the invention, part of the pixel electrode is formed on the island portion and wherein the upper electrode overlaps the part of the pixel electrode on the island portion.

In still another embodiment of the invention, part of the upper electrode is formed on the island portion and wherein the pixel electrode overlaps the part of the upper electrode on the island portion.

In still another embodiment of the invention, an area where the upper electrode is in contact with the island portion and an area where the pixel electrode is in contact with the island portion are respectively $5\times10^{-11}$ m$^2$ or more.

In still another embodiment of the invention, the second material is selected from a group containing Ti, Al, Cr, and Au.

Thus, the invention described herein makes possible the advantage of providing an active matrix substrate where the electrical connection between the upper electrode of the two-terminal nonlinear device and the pixel electrode is improved and the symmetrical nonlinear current-voltage characteristic is obtained between the current flowing from the upper electrode to the lower electrode and the current flowing from the lower electrode to the upper electrode.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples, with reference to the accompanying drawings.

Figure 1:
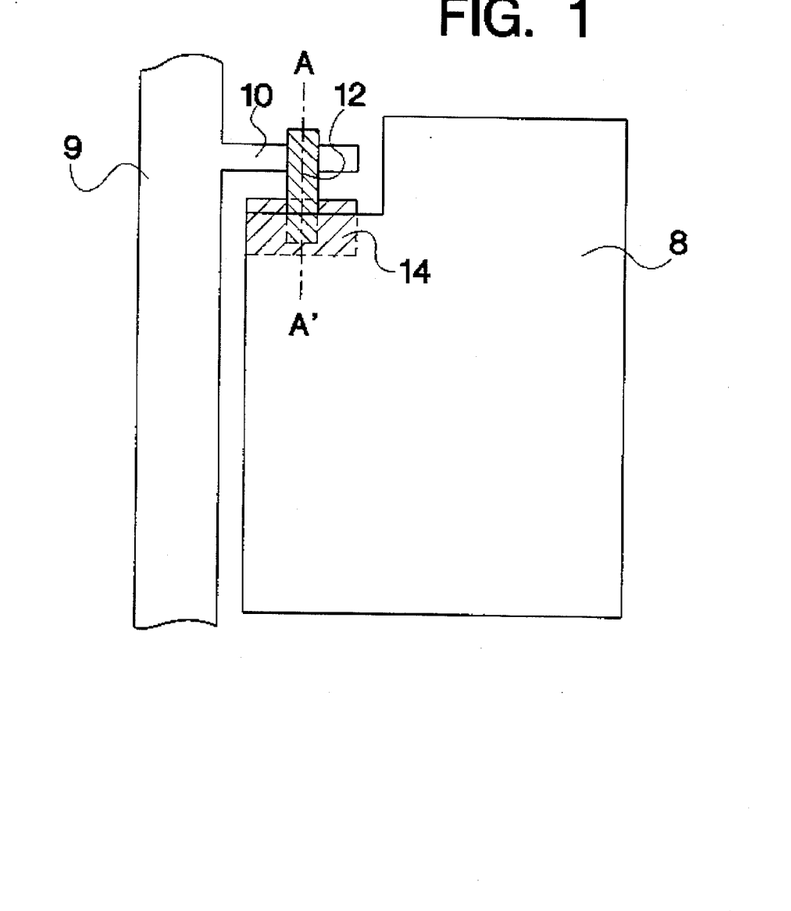
FIG. 1 is a plan view of an active matrix substrate in an example of the present invention.

FIG. 1 is a plan view of an active matrix substrate of an example of the present invention.

Figure 2:
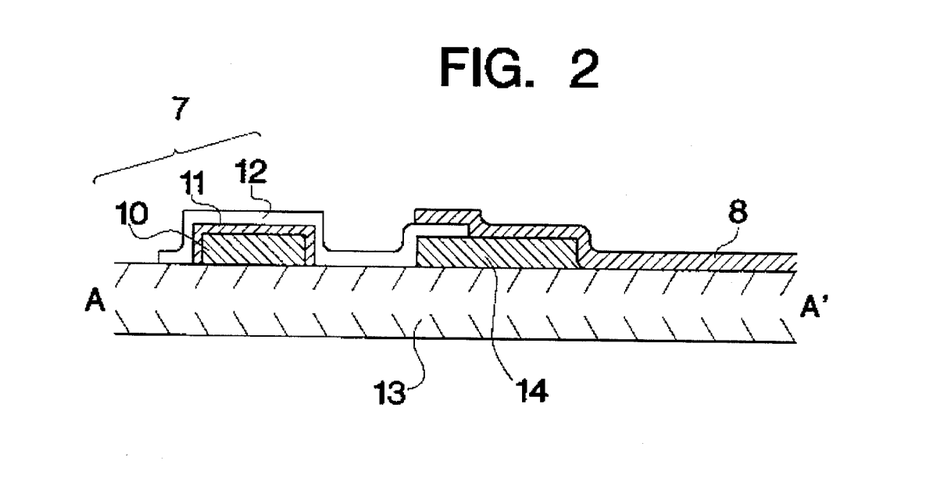
FIG. 2 is a cross-sectional view of FIG. 1 taken along a line A–A'.

FIG. 2 is a cross-sectional view of FIG. 1 taken along a line A–A'. FIGS. 1 and 2 show the active matrix substrate for 1 pixel. In these figures, the same structural elements of the active matrix substrate as those of the conventional active matrix substrate are denoted with the same reference numerals.

The active matrix substrate comprises a glass substrate 13. Signal lines 9 of Ta and lower electrodes 10 each branched from the signal lines 9 are formed on the glass substrate 13. An insulator 11 of $Ta_2O_5$ is formed on the exposed portions of each of the lower electrodes 10. A corresponding one of island portions 14 of Ta is formed apart from the lower electrode 10 on the substrate 13 in the vicinity of an MIM device 7. An upper electrode 12 of Ti or the like is formed so as to cover approximately half of each island portion 14. The MIM device 7 comprises one lower electrode 10, one upper electrode 12, and one insulator 11 interposed therebetween. Further, a corresponding one of pixel electrodes 8 of ITO is formed to cover part of the upper electrode 12 and the island portion 14. In such an active matrix substrate, the current flowing from the upper electrode 12 to the pixel electrode 8 or the current flowing from the pixel electrode 8 to the upper electrode 12 mainly passes through the island portion 14.

An exemplary fabrication process of the active matrix substrate in FIG. 1 will be now described.

First, a thin Ta film is deposited on the glass substrate 13 by a well-known method and then patterned to form the signal lines 9, the lower electrodes 10 and the island portions 14. It is preferred that the island portion 14 is formed at 10 μm or more apart from the signal line 9 and the lower electrode 10, respectively, in view of the etching accuracy of the Ta film. No-alkali glass, borosilicate glass, soda-lime glass, or the like may be used as the glass substrate 13. In this example, Fusion Pilex Glass (manufactured by Corning Japan, Co., Ltd.) is used for the glass substrate 13, on which the thin Ta film is deposited by sputtering so as to have a thickness of 3000 angstroms. In this example, sputtering is conducted under the conditions that the sputtering power is 5.3 $W/cm^2$; a temperature and the time for heating the glass substrate are 100° C. and 180 seconds, respectively; gas pressure is $4 \times 10^{-1}$ Pa; and the flow rate of sputtering gas is 30 sccm. The deposited thin Ta film is patterned into a desired shape by photolithography to form the signal lines 9, the lower electrodes 10 and the island portions 14, each signal line 9 and each lower electrode 10 having a line width of 20 μm and 5 μm, respectively, and each island portion 14 having a rectangular shape of 8 μm×14 μm.

Further, in this example, the signal line 9 and the lower electrode 10 are directly formed on the glass substrate 13. However, in order to prevent the contamination of the signal line 9 and the lower electrode 10 from the glass substrate 13, a base coating insulator can be previously deposited on the glass substrate 13, and the signal line 9, the lower electrode 10 and the island portion 14 can be formed thereon.

Successively, an exposed portion of each lower electrode 10 is anodized to form the insulator 11 of $Ta_2O_5$. In the present example, anodization is conducted in 1 wt % ammonium tartrate solution with a temperature of 25° C. and with a voltage of 31 V, thereby forming the insulator 11 with a thickness of 600 angstroms. Next, a thin metal film of Ta, Ti, Cr, or the like is deposited over the glass substrate 13 and then patterned into a desired shape by photolithography to form the upper electrodes 12. In this example, a thin Ti film is deposited on the glass substrate 13 by sputtering so as to have a thickness of 4000 angstroms and then patterned by photolithography to form the upper electrodes 12 with a line width of 6 μm so as to cover the lower electrodes 10 and approximately half of the island shape 14. In this way, the MIM device with a size of 5 μm×6 μm is fabricated.

An ITO film is further deposited on the glass substrate 13 bearing the MIM devices 7 so as to have a thickness of 1000 angstroms and then patterned into a desired shape by photolithography to form the pixel electrodes. In this way, the active matrix substrate in which the current flows between the pixel electrode 8 and the upper electrode 12 through the island portion 14 is fabricated.

Figure 3:
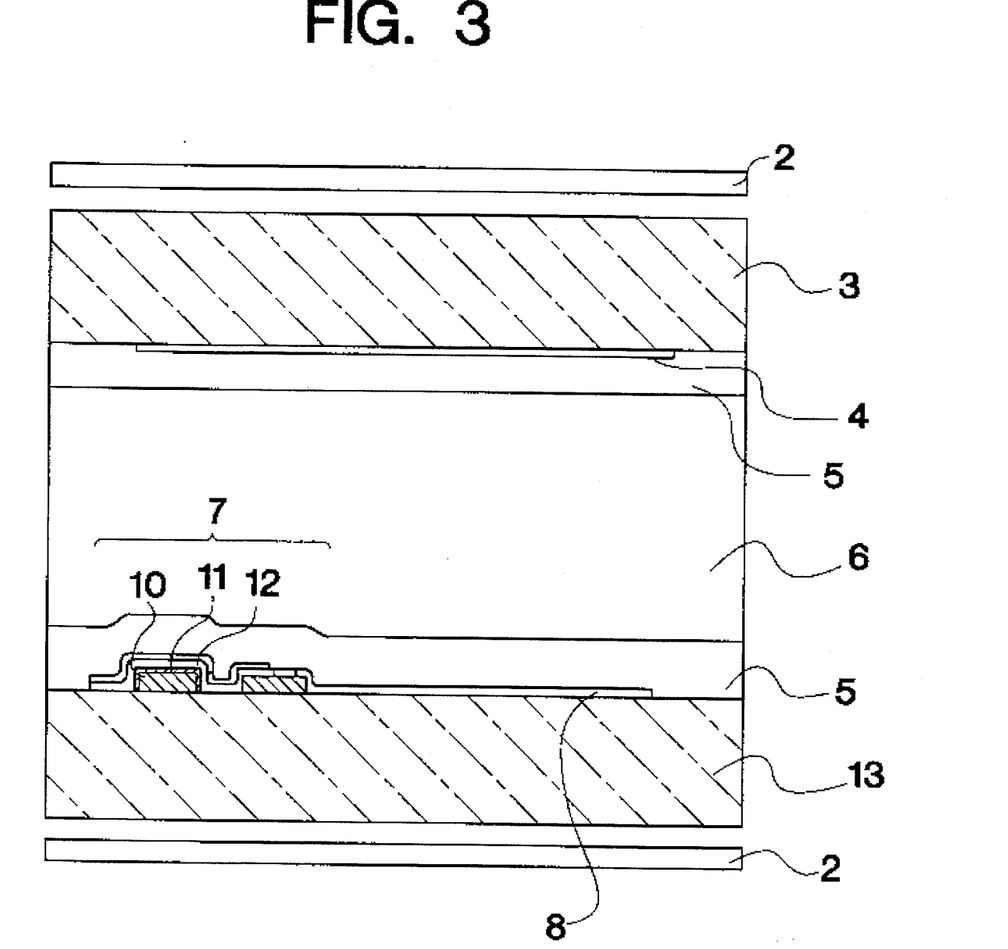
FIG. 3 is a cross-sectional view of a liquid crystal display apparatus fabricated by using an active matrix substrate of FIG. 1.

The active matrix substrate shown in FIGS. 1 and 2 is used for a liquid crystal display apparatus as shown in FIG. 3. The liquid crystal display apparatus comprises the active matrix substrate, a counter substrate, and a liquid crystal layer 6 interposed therebetween. The counter substrate also comprises a substrate 3 of the same glass as the active matrix substrate. On the substrate 3, counter electrodes 4 of an ITO transparent film or the like are formed so as to cross the signal lines 9 on the active matrix substrate to each other at a right angle. Orientation films 5 are formed over the substrate 3 on the side where the counter electrodes 4 are formed and the glass substrate 13 on the side where the signal lines 9 are formed. In order to obtain liquid crystal molecule alignments, the orientation films 5 are rubbed in prearranged directions. In such a state, the active matrix substrate and the counter substrate are attached to each other interposing the liquid crystal layer 6. A polarizing plate 2 is provided on a surface of each of the active matrix substrate and the counter substrate, respectively on the opposite side of the liquid crystal layer 6.

Figure 4:
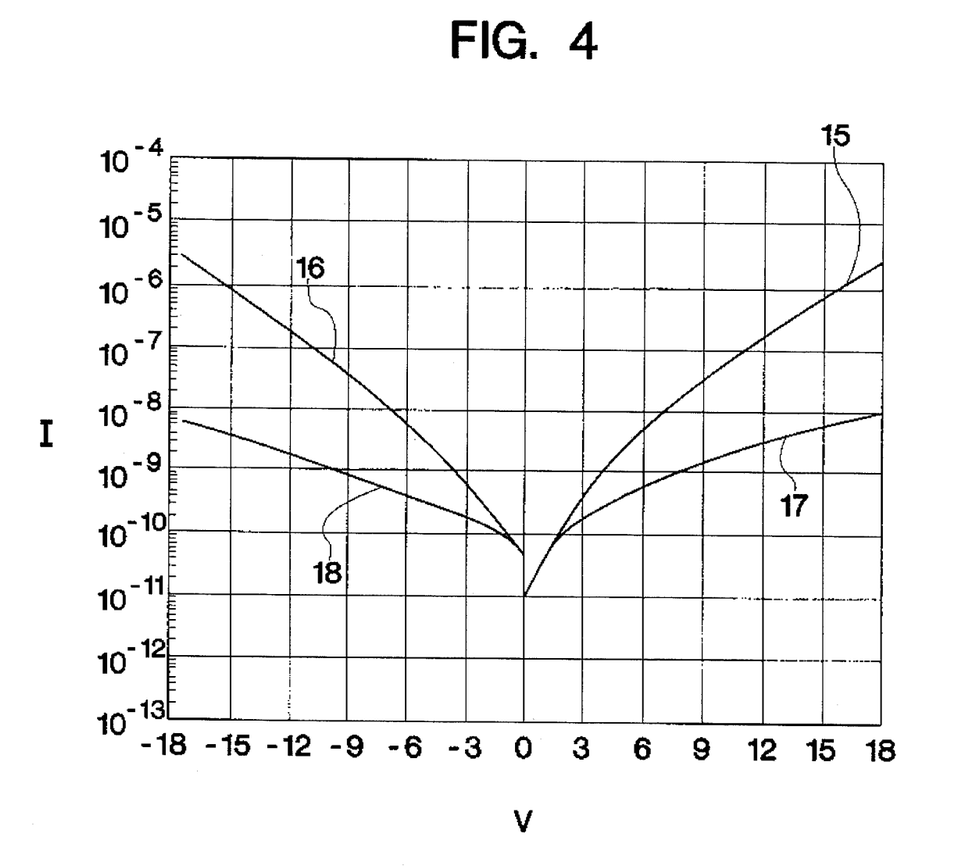
FIG. 4 is a diagram showing the current-voltage characteristics of MIM devices of the active matrix substrates of FIGS. 1 and 8.

FIG. 4 shows the current-voltage characteristics of the MIM device 7 of the active matrix substrate having the island portion 14 as shown in FIG. 1. The curve 15 represents the current-voltage characteristic of the MIM device in the case where the current flows from the upper electrode 12 through the island portion 14 to the pixel electrode 8 (hereinafter, the direction where the current flows in this way is referred to as "a positive direction") and the curve 16 represents the current-voltage characteristic in the case where the current flows from the pixel electrode 8 through the island portion 14 to the upper electrode 12 (hereinafter, the direction where the current flows in this way is referred to as "a negative direction"). FIG. 4 also shows, as a Comparative Example, current-voltage characteristics of an MIM device of an active matrix substrate fabricated in the same way except that the island portion 14 is not formed. The current-voltage characteristics of the Comparative Example is represented by the curves 17 and 18. As is understood from FIG. 4, the degree of ohmic contact in this example is superior to that in the Comparative Example. This is attained by electrically connecting the upper electrode to the pixel electrode using the island portion as a contact, as the upper electrode and the pixel electrode make ohmic contact with each other. Accordingly, in this example, the current flows between the upper electrode 12 and the pixel electrode 8 mainly through the island portion 14.

The current flowing between the lower electrode 10 and the upper electrode 12 of the MIM device will be now described. The MIM device takes advantage of a Poole-Frenkel current flowing in the insulator interposed between the lower electrode 10 and the upper electrode 12. The Poole-Frenkel current is represented by the following Formula (1):

$$\ln(I/V) = \ln\alpha + \beta \sqrt{V} \qquad (1)$$

wherein, coefficients $\alpha$ and $\beta$ show the conductivity of the MIM device and the nonlinearity of the resistance of the MIM device, respectively. In this case, as the coefficient $\alpha$ increases, the resistance of the MIM device decreases; and as the coefficient $\beta$ increases, the voltage ratio ($V_{ON}/V_{OFF}$) in the vicinity of the threshold voltage becomes larger, making it possible to obtain a liquid crystal display apparatus with a high contrast.

Figure 5:
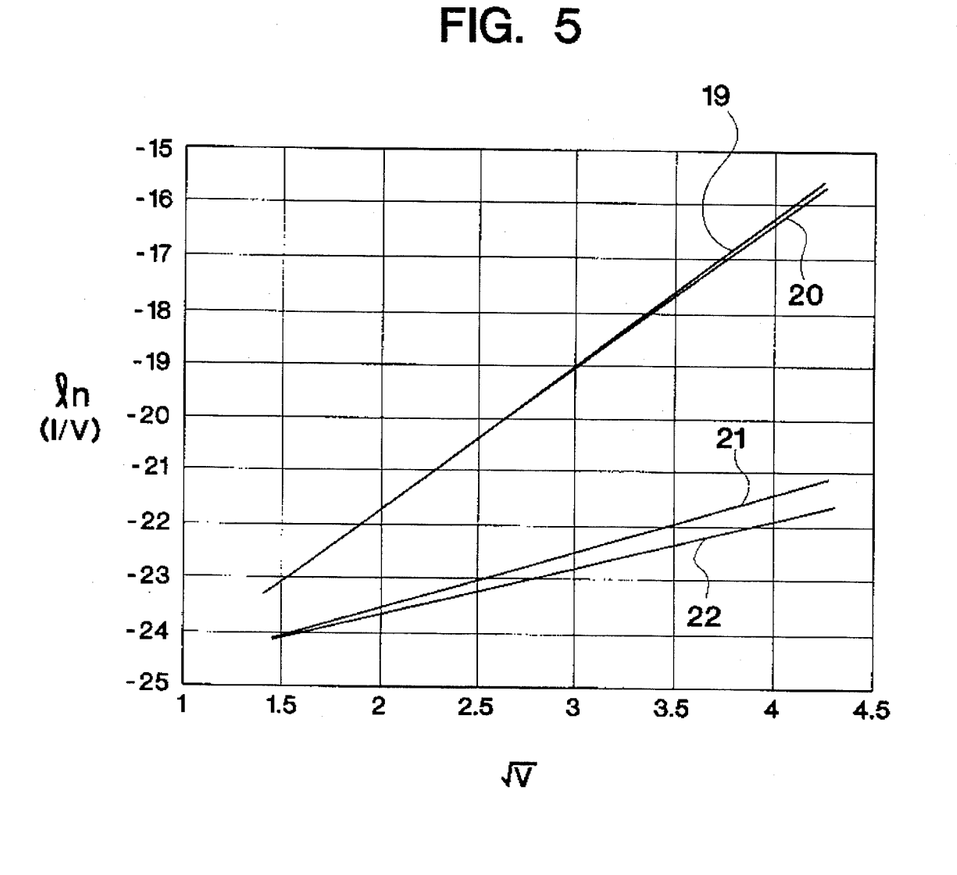
FIG. 5 shows Poole-Frenkel plots of MIM devices of the active matrix substrates of the present invention and Comparative Example.

FIG. 5 shows Poole-Frenkel plots. In this figure, a line 19 is the Poole-Frenkel plot in the case where a current flows in the MIM device of FIG. 1 in the positive direction; and a second line 20 is the Poole-Frenkel plot in the case where the current flows in the MIM device of FIG. 1 in the negative direction. Further, lines 21 and 22 are the Poole-Frenkel plots of Comparative Example in the case where the current flows in the positive direction and the negative direction, respectively. As is understood from FIG. 5, the current-voltage characteristic of the MIM device 7 with the island portion 14 of this example has an excellent symmetrical curve in the positive direction and the negative direction, compared with the MIM device of Comparative Example. Further, the current-voltage characteristic of the MIM device in the positive direction almost coincides with that in the negative direction.

Further, on the basis of such a Poole-Frenkel plot, the coefficients $\alpha$ and $\beta$ can be obtained from a Y intercept and a gradient of each line. In the MIM device 7 of this example, $\alpha=9.36\times10^{-14}$ and $\beta=3.28$ are obtained by averaging values from the Y intercepts and the gradients of the lines 19 and 20. Further, in the MIM device of the Comparative Example, $\alpha=5.11\times10^{-12}$ and $\beta=1.15$ are obtained by averaging values from those of the lines 21 and 22. The coefficient $\beta$ representing the nonlinearity of the MIM device 7 of this example is larger than that of Comparative Example, as shown in FIG. 5. Accordingly, the nonlinearity of the MIM device 7 of this example is better than that of Comparative Example.

In the active matrix substrate shown in FIG. 1, the upper electrode 12 of the MIM device is formed of Ti. However, the upper electrode 12 can also be formed of Al. In this case, since there is a probability that the Al film is etched while the ITO film is patterned to form the pixel electrodes 8, the pixel electrodes 8 are formed after deposition of the anodized oxide film and then the upper electrode 12 is formed in the reverse order compared with the order of the active matrix substrate shown in FIG. 1.

Figure 6:
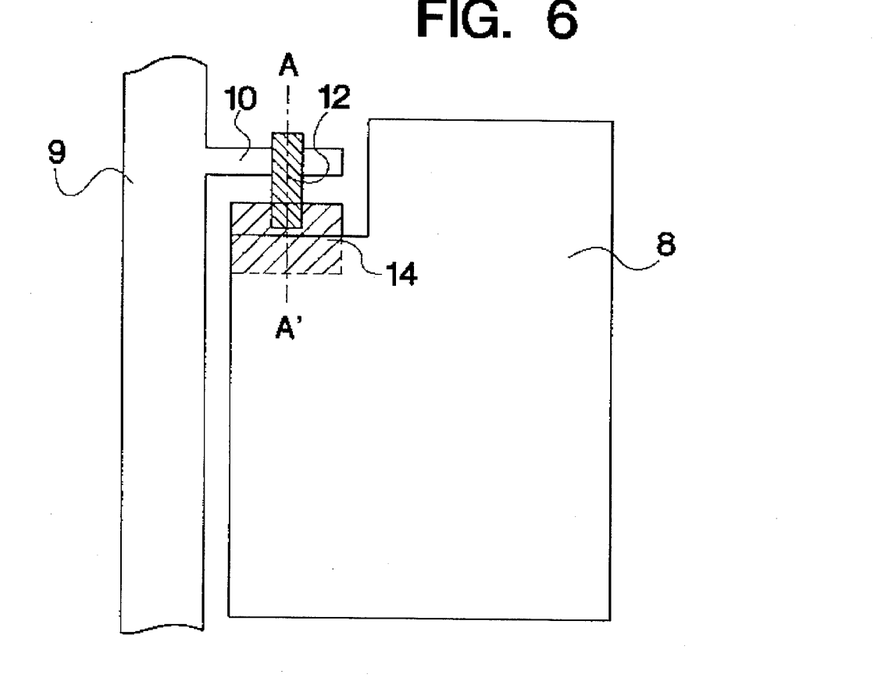
FIG. 6 is a plan view of an active matrix substrate in a modified example of the present invention.
Figure 7:
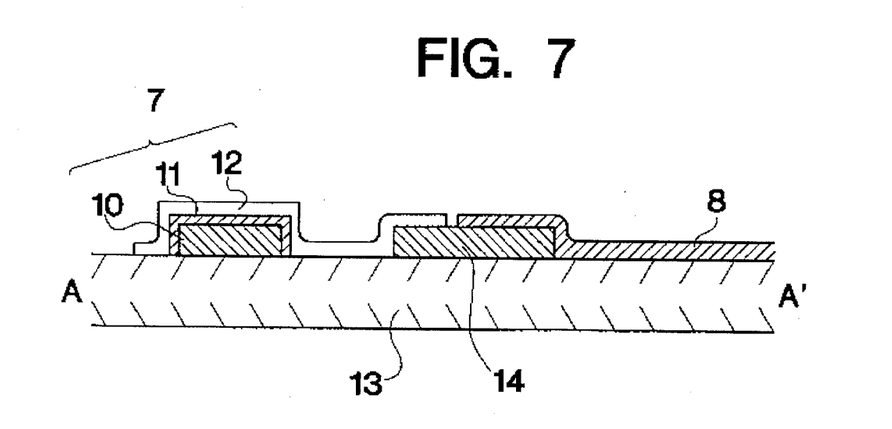
FIG. 7 is a cross-sectional view of FIG. 6 taken along a line A–A'.

FIGS. 6 and 7 show a modified example. An active matrix substrate of this modified example is fabricated in the same way as that for fabricating the active matrix substrate of FIG. 1 except that the upper electrode 12 and the pixel electrode 8 are formed with an interval therebetween on the island portion 14 as shown in FIGS. 6 and 7. In FIG. 1, the current flows from the upper electrode 12 of the MIM device 7 to the pixel electrode 8 mainly through the island portion 14; however, part of the current directly flows from the upper electrode 12 to the pixel electrode 8. On the other hand, in this modified example shown in FIG. 6, the current flows from the upper electrode 12 to the pixel electrode 8 only through the island portion 14. Accordingly, the nonlinearity of an MIM device of this modified example is better and more symmetrical than that of the nonlinearity of the MIM device 7 of the active matrix substrate shown in FIG. 1.

It is preferred that in both examples, a region where the upper electrode 12 and the island portion 14 are directly in contact with each other and a region where the pixel electrode 8 and the island portion 14 are directly in contact with each other are large. According to investigations of the inventors of the present invention, when the active matrix substrates in both of these examples are fabricated so that the above-mentioned regions respectively have an area of $5\times10^{-1}$ m$^2$ or more, the upper electrode 12 of the MIM device 7 and the pixel electrode 8 are electrically well connected to each other.

In these examples, the upper electrode of the MIM device is formed of Ti or Al. However, the material for the upper electrode is not limited to Ti and Al. Any conductive materials can be used as long as an etchant used for patterning a film of such a material does not etch the lower electrode and the insulator. For example, Cr, Au, Ag, Mo, or the like can be used for the material of the upper electrode, as well as Ti. In particular, in the case where the upper electrode is formed of a metal easily oxidizable such as Al, Zn, or Sn, the formation of the island portion provides an advantage that the deterioration of the electrical connection between the upper electrode and the pixel electrode due to the oxidation of the upper electrode on the interface between the upper electrode and the pixel electrode can be prevented, as well as an advantage that the upper electrode can make good ohmic contact with the pixel electrode.

As is apparent from the above, since the active matrix substrate of the present invention includes the island portion to electrically connect the upper electrode of the MIM device to the pixel electrode, the current flows from the upper electrode to the pixel electrode mainly through the island portion. The island portion functions as a contact which allows the upper electrode to make ohmic contact with the pixel electrode. Accordingly, an excellent electrical connection between the upper electrode and the pixel electrode is obtained without deteriorating the nonlinearity of the two-terminal nonlinear device, so that excellent transmittance of data from the signal line to the pixel electrode is secured. Further, the upper electrode can make ohmic contact with the pixel electrode by using the island portion as a contact, whereby the symmetrical property between the current flowing from the upper electrode to the pixel electrode and the current flowing from the pixel electrode to the upper electrode with respect to the voltage applied to the MIM device is not deteriorated. Accordingly, in a liquid crystal display apparatus using the active matrix substrate of the present invention, a display with high quality in which the residual image, flicker, and the like do not occur can be obtained. Moreover, according to the present invention, since the island portions can be easily formed by patterning the same film as that of the lower electrode, the fabrication processes are not complicated.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix substrate, comprising:

an insulating substrate;

a pixel electrode formed on the insulating substrate;

a signal line for supplying a signal charge to the pixel electrode;

a two-terminal nonlinear device including a lower electrode formed on the insulating substrate, an insulator covering the lower electrode, and an upper electrode formed on the insulator, the device changing a current which flows through the insulator in accordance with a voltage applied to the lower electrode and the upper electrode; and an island portion for connecting the upper electrode to the pixel electrode, the island portion being separated from the lower electrode and making ohmic contact with each of the upper electrode and the pixel electrode.

2. An active matrix substrate according to claim 1, wherein the island portion is formed of the same material as that of the lower electrode.

3. An active matrix substrate according to claim 2, wherein the lower electrode and the island portion are formed of the same layer.

4. An active matrix substrate according to claim 1, wherein the lower electrode is formed of a first material; the upper electrode is formed of a second material; and the pixel electrode is formed of a third transparent material.

5. An active matrix substrate according to claim 4, wherein the upper electrode makes non-ohmic contact with the pixel electrode.

6. An active matrix substrate according to claim 4, wherein the insulator is an oxide film obtained by anodization of an exposed portion of the lower electrode.

7. An active matrix substrate according to claim 4, wherein the second material is selected from a group containing Ti, Al, Cr, and Au.

8. An active matrix substrate according to claim 1, wherein the lower electrode is formed of Ta.

9. An active matrix substrate according to claim 1, wherein the upper electrode and the pixel electrode are directly in contact with parts of the island portion, respectively.

10. An active matrix substrate according to claim 9, wherein part of the pixel electrode is formed on the island portion and wherein the upper electrode overlaps the part of the pixel electrode on the island portion.

11. An active matrix substrate according to claim 9, wherein part of the upper electrode is formed on the island portion and wherein the pixel electrode overlaps the part of the upper electrode on the island portion.

12. An active matrix substrate according to claim 9, wherein an area where the upper electrode is in contact with the island portion and an area where the pixel electrode is in contact with the island portion are respectively $5 \times 10^{-11}$ m$^2$ or more.

13. An active matrix substrate, comprising:

an insulating substrate;

a pixel electrode formed on the insulating substrate;

a signal line for supplying a signal charge to the pixel electrode;

a two-terminal nonlinear device including a lower electrode of a first material formed on the insulating substrate, an insulator covering the lower electrode, and an upper electrode of a second material different from said first material formed on the insulator, the device changing a current which flows through the insulator in accordance with a voltage applied to the lower electrode and the upper electrode; and an island portion of said first material for connecting the upper electrode to the pixel electrode, the island portion being separated from the lower electrode and making ohmic contact with each of the upper electrode and the pixel electrode, wherein said upper electrode makes non-ohmic contact with said pixel electrode.

14. An active matrix substrate, comprising:

an insulating substrate;

a pixel electrode formed on the insulating substrate;

a signal line for supplying a signal charge to the pixel electrode;

a two-terminal nonlinear device including a lower electrode formed on the insulating substrate, an insulator covering the lower electrode, and an upper electrode formed on the insulator, the device changing a current which flows through the insulator in accordance with a voltage applied to the lower electrode and the upper electrode; and an island portion for connecting the upper electrode to the pixel electrode, the island portion being separated from the lower electrode and making ohmic contact with each of the upper electrode and the pixel electrode, wherein current flowing between said pixel electrode and said upper electrode mainly passes through said island portion.

* * * * *